Figure 1:
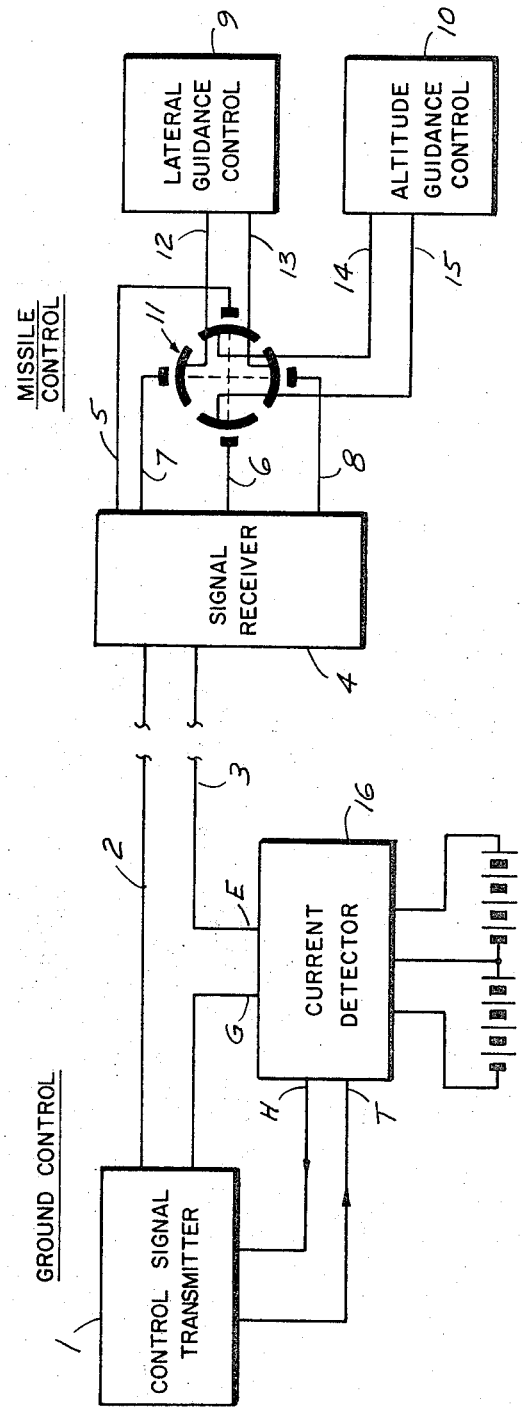

INVENTORS
TORE L. JANSSON
CARL JOHAN HOLMSTRÖM
BY
ATTORNEYS

CURRENT DETECTOR MEANS — 16

INVENTORS
TORE L. JANSSON
CARL JOHAN HOLMSTRÖM
BY
*Hane and Nydrick*

ATTORNEYS

3,351,847
CURRENT-DETECTING APPARATUS
Tore Lennart Jansson and Sven Carl Johan Holmström, Karlskoga, Sweden, assignors to Aktiebolaget Bofors, Bofors, Sweden, a Swedish company
Filed Nov. 30, 1964, Ser. No. 414,714
Claims priority, application Sweden, Dec. 4, 1963, 13,456/63
13 Claims. (Cl. 323—4)

This invention relates to current-detecting apparatus, and more particularly to such apparatus wherein the voltage of the input to the apparatus may vary.

Current detectors are employed in many automatic control systems wherein the magnitude and repetition rate or duration of sensed current pulses determine the parameters of control signals. A typical automatic control system is a guided rocket-type missile system. In such a system, a current detector is connected to a stationary control signal transmitter by two conductor wires for transmitting guidance signals to the missile in flight in order to guide the missile toward its target. The current detector serves to measure the current, irrespective of the direction thereof, in one of the two wires connecting the control transmitter to the missile in flight in order to provide an impulse which enables the repetition frequency of the guidance signals transmitted to the missile through the wires to be controlled so that it is related in a predetermined manner to the spinning rate of the missile around its longiutdinal axis while in flight.

In such a system, the voltage at the input of the current detector can change. Since the current detector is powered by its own battery, the voltage at the input will vary with respect to the voltage output of the battery. If the variations exceed a given amount, the current detector operates unreliably.

It is, therefore, a general object of the invention to provide an improved current-detecting apparatus.

It is another general object of the invention to provide current-detecting apparatus which operates reliably over a wide range of input signal voltages.

It is a specific object of the invention to provide a circuit for control of the voltage difference between an input terminal of a current detector which is arranged to measure a current supplied to the input terminal, and a connecting point of the current detector, which has current supplied thereto from the outer terminals of a direct current source wherein the voltage difference is maintained at a value which is constantly greater than a predetermined minimum value regardless of the potential the input terminal has relative to the current source.

Broadly, the invention contemplates a current-detecting means including a current detector circuit having an input terminal through which current can pass, and a connecting terminal. A current source having first and second output terminals supplies operating current to the current detector circuit. In combination therewith, there is provided apparatus for maintaining the voltage difference between the connecting and input terminals of the current detector circuit to greater than a minimum value. The apparatus includes a unilateral conducting device connected between the connecting point or terminal and an input terminal of the current source, and a capacitor having one terminal connected to the connecting terminal, and a second terminal. A means for transmitting a voltage pulse when the voltage difference between the input terminal of the current detector circuit and a terminal of the current source is less than a predetermined value is connected to the second terminal of the capacitor. When the voltage pulse is received, it is transmitted through the capacitor to cause the voltage at the connecting terminal to change in such a way that the desired voltage difference is maintained.

Figure 2:
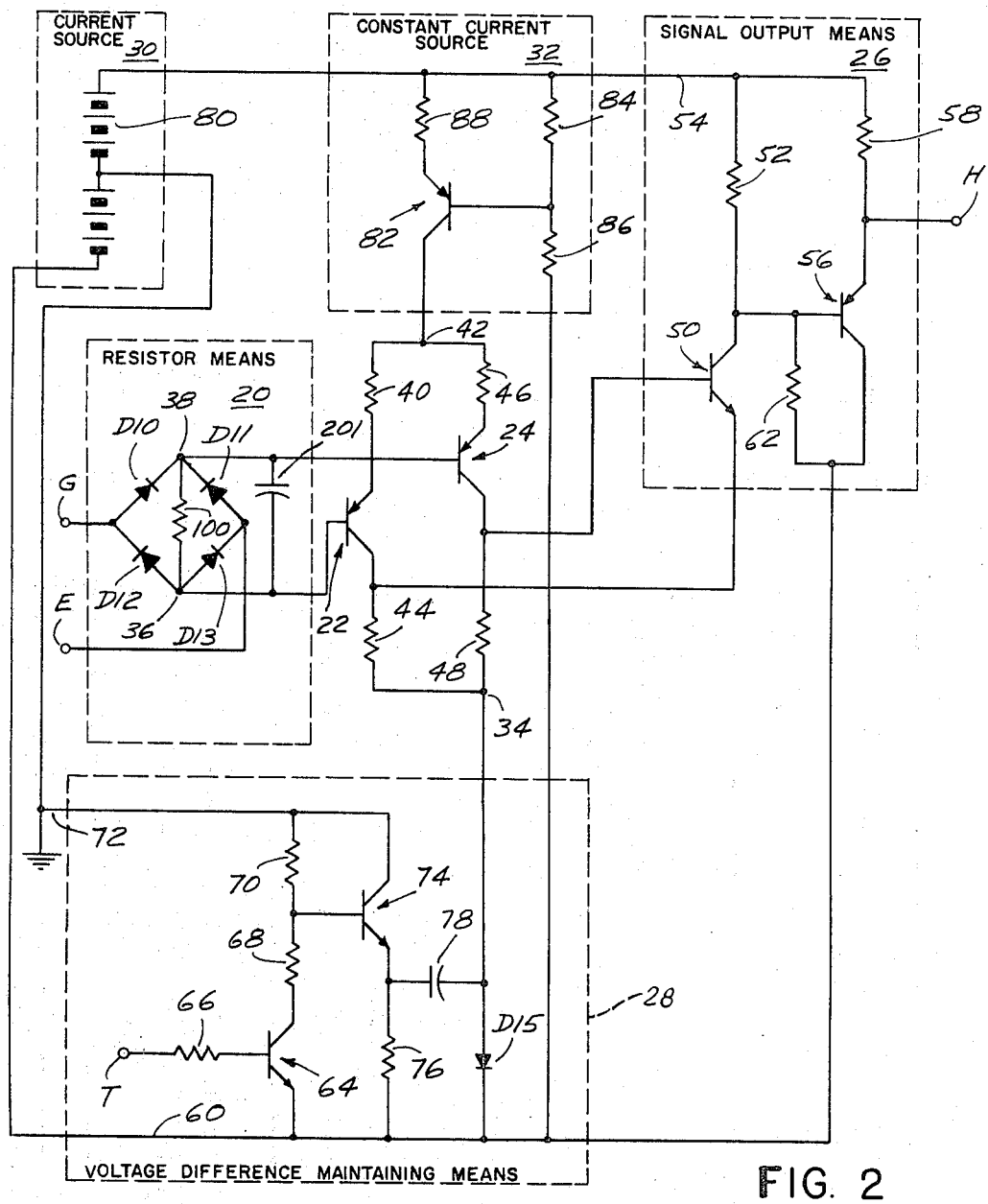

Other objects, features and advantages of the invention will be apparent from the following detailed description, when read with the accompanying drawing, which shows, by way of example and not limitation, apparatus for practicing the invention. In the drawing:

FIG. 1 is a block diagram of a missile control system incorporating an embodiment of the invention; and FIG. 2 is a schematic diagram of the embodiment of the invention incorporated in FIG. 1.

In FIG. 1, the numeral 1 refers generally to a stationary signal transmitter by means of which an operator can, by suitable actuating means, transmit guidance signals through conductor wires 2 and 3 to a missile (not shown) in flight. The signals are altitude and lateral guidance signals. The altitude and lateral guidance signals are separated by a signal-receiving means 4 in the missile, into altitude and lateral guidance signals through lines 5, 6 and 7, 8 respectively. The signals are conducted respectively to the lateral guidance control 9 and the altitude guidance control 10 of the missile. In flight, the missile spins about its longitudinal axis. Therefore, the guidance means must shift from the lateral to the altitude-guiding function for each quarter of a revolution of the missile. The shifting is achieved by a commutator 11 which has two pairs of oppositely disposed segments. One pair of opposite segments are connected through lines 12 and 13, respectively, to guidance control 9 of the missile, and the other pair of opposite segments are connected through lines 14 and 15, respectively, to guidance control 10 of the missile. Furthermore, commutator 11 has four brushes. Two opposite ones are connected to the lines 5 and 6 for the lateral guidance signals, and the other two to the lines 7 and 8 for the altitude guidance signals. The axis of the commutator 11 is maintained in a fixed position by a conventional gyroscope means in the missile, so that the missile and thereby the brushes revolve around the commutator segments to achieve the necessary reversion of the function of the guidance means 9 and 10.

It is desirable to control the frequency of repetition of the control signals transmitted to the missile so that it is related, in a predetermined manner, to the variable speed of spin of the missile. This purpose is accomplished by a current detector means 16 which is included in the stationary equipment and through which passes one of the wires, namely 3, connecting the missile with the control signal transmitter 1 at terminals G and E.

If the circuit through the missile is closed, a current of a given minimum value, say $2I_0$, flows through wires 2 and 3. When the missile circuit is broken, which occurs for each 90° turn of the revolution of the missile around its longitudinal axis, the current in wires 2 and 3 will be zero. The current detector means 16 functions so that, when the current falls below $I_0$, the voltage on the line connected to terminal H, passing from the current detector means 16 to the control signal transmitter 1 is changed from one value to another value. When the interruption in the current ceases and the current again exceeds $I_0$, the voltage at terminal H returns to is initial value. Thus there appears a voltage impulse at terminal H for each interruption of the missile; that is, for each quarter of a revolution of the missile. These impulses are utilized to control the frequency of repetition of the guidance signal in the manner referred to. Each such impulse generates an impulse of constant voltage amplitude and constant time duration. By forming the time average of this pulse sequence, a voltage is obtained which is proportional to the impulse frequency and thereby to the speed of rotation of the missile. This voltage controls the frequency of repetition of a conventional sweep generator in the control signal transmitter 1, which together with signals coming from a manually operable control member forms the signal from the control signal transmitter 1 to the missile.

The means for providing the functions described briefly above are not per se a part of the present invention, and therefore will not be described in detail.

The current detector means 16 will now be described with reference to FIG. 2. Current detector means 16 includes: a resistor means 20 connected to terminals G and E through which the current to be detected passes; a current detector centered around p-n-p transistors 22 and 24 for receiving signals from resistor means 20; a signal output means 26 for transmitting voltage pulses in response to signals from transistors 22 and 24; a voltage-difference-maintaining means 28; a current source 30; and a constant current source 32. Current source 30 provides operating currents for the various elements; and constant current source 32 provides a current of constant magnitude to the transistor combination 22, 24. Voltage-difference-maintaining means 28 controls the voltage of the connecting point 34 of the transistor combination 22, 24.

Resistor means 20 is basically a bridge rectifier having four serially connected arms to form a closed loop. Each arm includes a diode, namely, diodes D10, D11, D12 and D13. The input terminal of the bridge rectifier are the junction between the arms including diodes D10 and D12 and the junction between the arms including diodes D11 and D13, which are respectively connected to terminals G and E. A resistor 100 is connected between the junction of diodes D10 and D11 and the junction between diodes D12 and D13, which are the output terminals 38 and 36. Leveling capacitor 201 is connected across the output terminals 36 and 38. The bridge rectifier is provided so that regardless of the direction of the current flow in wire 3 (FIG. 1) connected to terminals G and E, the voltage of terminal 38 is never below the voltage of terminal 36.

Transistor 22 includes a base (input terminal) connected to output terminal 36, an emitter connected via a resistor 40 to a terminal 42, and a collector (output terminal) connected via a resistor 44 to a junction point 34. Transistor 24 includes a base (input terminal) connected to an output terminal 38, an emitter connected via a resistor 46 to a terminal 42, and a collector (output terminal) connected via a resistor 48 to a junction point 34. Transistors 22 and 24 transmit signals in accordance with the magnitude of the voltage difference between their bases.

Signal output means 26 includes: an n-p-n transistor 50 having a base connected to the collector of transistor 24, a collector connected via a resistor 52 to a bus 54, and an emitter connected to the collector of transistor 22; and a p-n-p transistor 56 having a base (input terminal) connected to the collector of transistor 50, an emitter (output terminal) connected via a resistor 58 to bus 54, and a collector connected to a bus 60. A resistor 62 connects the base of transistor 56 also to bus 60. The terminal H is connected to the emitter of transistor 56.

Voltage-difference-maintaining means 28 includes: a diode D15 connected between junction point 34 and bus 60; an n-p-n transistor 64 having a base (input terminal) connected via a resistor 66 to a terminal T, an emitter connected to bus 60, and a collector connected via serially connected resistors 68 and 70 to a grounded bus 72; an n-p-n transistor 74 having a base (input terminal) connected to the junction of resistors 68 and 70, a collector connected to bus 72, and an emitter connected via a resistor 76 to bus 60; and a capacitor 78 connecting the emitter of transistor 74 to connecting point 34.

Current source 30 comprises a battery 80 having a positive outer terminal connected to bus 54, a negative outer terminal connected to bus 60, and a grounded intermediate terminal connected to bus 72.

Constant current source 32 comprises a p-n-p transistor 82 having a base connected to the junction of resistors 84 and 86, which are serially connected between busses 54 and 60, an emitter connected via a resistor 88 to bus 54 and a collector (output terminal) connected to terminal 42.

The operation of the current detector means 16 will now be described. The current between terminals G and E is to be measured independently of its direction. For this purpose the current is rectified by the diode bridge of resistor means 20. When current flows from terminal G to terminal E, it passes through diode D10, the resistor 100 and the diode D13; and when the current flows from terminal E to terminal G, the path is through diode D11, resistor 100 and diode D12. In both cases, the current passes in the same direction through the resistor 100. Therefore, the detector means 16 can function independently of the original current direction. When current passes through resistor 100, there appears across terminals 36 and 38 an electric voltage whose magnitude is proportional to the current. When the current is normal ($2I_o$), this voltage is $2V_o$, and when the current is $I_o$, the voltage is $V_o$. The voltage is sensed by the transistors 22 and 24 in the following manner: The transistor 82 of constant current source 32 is connected by means of the resistors 84, 86 and 88 to current source 30 so that it generates a constant current which is divided into two paths. One path is through the resistor 40, transistor 22 and resistor 44; the other is through the resistor 46, transistor 24 and resistor 48. How the current is divided depends on the voltage across the resistor 100. When a normal bias current flows and the voltage across resistor 100 is $2V_o$, almost all current flows from constant current source 32 through resistor 40, transistor 22 and resistor 44. The voltage at the junction of resistor 44 and transistor 22 will be more positive than at the junction of resistor 48 and transistor 24. The transistor 50 of signal output means 26, connected between these junctions, will be blocked, and no current is drawn through resistor 52 from bus 54. Transistor 56 is blocked, and the voltage at terminal H is high. When the current through terminals E and G is zero, the voltage across resistor 100 also is zero. Transistor 24 conducts, and transistor 22 is blocked. Current from constant current source 32 passes through resistor 46, transistor 24 and resistor 48. Now the junction of transistor 24 and resistor 48 will be more positive than the junction between transistor 22 and resistor 44. Hence, transistor 50 draws current through resistor 52. The voltage developed across resistor 52 is fed to the base of transistor 56, which conducts, causing the voltage at terminal H to drop. The resistances of resistors 40 and 46 are so selected that there is no voltage difference between the collectors of transistors 22 and 24 when the voltage across the resistor 100 is $V_o$. The transistor 50 is then just between the conditions of conducting and not conducting.

The voltage across resistor 100 is to be measured independently of the voltage the wire 3 has at terminal G relative to the voltages of the outer terminals of current source 30. For example, the terminal connected to bus 60 may be —24 volts. During a portion of the signal period, however, terminal G will have a voltage which is close to —24 volts. If no special measures were taken —that is, if the connecting point 34 were connected directly to bus 60—the operation of the detecting circuit centered around transistors 22 and 24 would be jeopardized. In order to operate correctly, point 34 should be, for instance, at least 6 or 7 volts more negative than terminal G.

Voltage-difference-maintaining means 28 assures that the point 34 will be at the proper voltage level. The control signal transmitter 1 (FIG. 1) is so arranged that when terminal G is at a voltage more positive than —21 volts, no current flows to the terminal T from the control signal transmitter 1. In that case, no current can flow through resistor 66 to the base of transistor 64, and the current through the resistors 68 and 70 will then be substantially zero. Therefore, no voltage drop occurs across the resistor 70. The base of transistor 74 will be at ground potential, since resistor 70 is connected to grounded bus 72. Transistor 74 conducts a current whose magnitude is determined practically by the resistors 76. Accordingly, the emitter of transistor 74 will have a voltage of approximately —0.5 volt, which is the normal voltage drop across transistor 74. Since at the same time the voltage drop across diode D15 is approximately 0.5 volt, the connecting point 34 and the opposite plate of the capacitor 78 will be about —23.5 volts. The situation just described normally has no influence on the current detector circuit, since the current from connecting point 34 is fed via diode D15 to bus 60.

However, if terminal G is more negative than —21 volts, control signal transmitter 1 is arranged so that a current is fed to terminal T from the control signal transmitter. This current passes through resistor 66, causing transistor 64 to conduct. The resistor 70 is, for instance, 3.3 kilohms, and assuming that the voltage drop across transistor 64 is slight, the voltage drop between busses 60 and 72, which is about 24 volts, is divided so that about 8 volts will be across resistor 70. This voltage of —8 volts is applied to the base of transistor 74, which adjusts to this changed condition by changing its current so that the voltage drop across resistor 76 at the reduced current will be such that the emitter of transistor 74 is at —8.5 volts. The voltage drop between the base and emitter of transistor 74 is small, and the major part of the voltage drop across the transistor 74 will be between the collector and the base. The capacitor 78 has a capacitance such that it cannot change its charge immediately. Accordingly, it causes the connecting point 34, which was at —23.5 volts, to drop to about —32.5 volts. Thus, the terminal G will be about 10 volts more positive than the connecting point 34. The diode D15 is polarized so that it prevents the voltage on bus 60, that is, —24 volts, from influencing the point 34. The current from point 34 enters the capacitor 78, and the point 34 will go toward more positive values, and will be at about —29 volts, before terminal G is again more positive than —21 volts. At this time the current fed to terminal T ceases, and the above-mentioned voltage values at transistors 64 and 74 are restored, whereupon the lost charge on capacitor 78 is restored from bus 72 via transistor 74 and diode D15. Of course, to allow sufficient time for recharging capacitor 78, the time during which terminal G can be at a voltage of —21 volts should be restricted to 97% of the signal period.

While only one embodiment of the invention has been shown and described in detail, there will now be obvious to those skilled in the art many modifications and variations which satisfy many or all of the objects of the invention, but which do not depart from the spirit thereof as defined by the appended claims.

What is claimed is:

1. In combination with means for detecting a current comprising a current detector circuit including an input terminal through which current is adapted to pass and a connecting terminal, and a current source including first and second outer terminals, all said terminals being connected to said current detector circuit for supplying operating current thereto, apparatus for maintaining the voltage difference between the connecting and input terminals of said current detector circuit at greater than a given minimum value, said apparatus comprising a unilateral conducting device connected between said connecting terminal and the second outer terminal of said current source, a capacitor including a first terminal connected to said connecting terminal and a second terminal, means including an output terminal adapted to transmit a voltage pulse when the voltage difference between the input terminal of said current detector circuit and the second terminal of said source of current is less than a predetermined value, and means for connecting the output terminal of said last-named means to the second terminal of said capacitor to cause the voltage at said connecting point to change.

2. In combination with means for detecting a current, said means comprising a current detector circuit including an input terminal through which current is adapted to pass and a connecting terminal, a current source including first and second outer terminals and an intermediate terminal, means connecting said outer terminals to said current detector circuit for supplying operating current thereto, apparatus for maintaining the voltage difference between the input and connecting terminals of said current detector circuit at greater than a given minimum value, said apparatus comprising a unilateral conducing device connected between said connecting terminal and the second outer terminal of said current source, a capacitor including a first terminal connected to said connecting terminal and a second terminal, a transistor including an emitter, a collector and a base, a resistor for connecting said emitter to said second outer terminal of said current source, means for connecting said emitter to said second terminal of said capacitor, and means for connecting said collector to the intermediate terminal of said current source, said base receiving a voltage pulse when the voltage difference between the input terminal of said current detector circuit and the second outer terminal of said source of current is less than a predetermined value so that said voltage pulse is transmitted from the emitter of said transistor to said capacitor, whereby the voltage at said connecting point is changed.

3. The apparatus of claim 2, wherein said second outer terminal is negative with respect to said first outer terminal of said current source and the voltage pulse has a polarity and magnitude such that said connecting terminal is driven a given amount more negative with respect to said second outer terminal.

4. In combination with means for detecting a current, said means comprising a current detector circuit including an input terminal through which current is adapted to pass and a connecting terminal, a current source including first and second outer terminals and an intermediate terminal, means connecting said outer terminals to said current detector circuit for supplying operating current thereto, apparatus for maintaining the voltage difference between the input and connecting terminals of said current detector circuit at greater than a given minimum value, said apparatus comprising a unilateral conducting device connected between said connecting terminal and the second outer terminal of said current source, a capacitor including a first terminal connected to said connecting terminal and a second terminal, a first transistor including an emitter, a collector and a base, a first resistor for connecting said emitter to said second outer terminal of said current source, means for connecting said emitter to said second terminal of said capacitor, means for connecting said collector to the intermediate terminal of said current source, a second transistor including an emitter, a collector and a base, means for connecting the emitter of said second transistor to the second outer terminal of said current source, second and third serially connected resistors for connecting the intermediate terminal of said current source to the collector of said second transistor, and means for connecting the junction of said second and third resistors to the base of said first transistor, the base of said second transistor receiving a voltage pulse when the voltage difference between the input terminal of said current detector circuit and the second outer terminal of said source of current is less than a predetermined value so that said voltage pulse is transmitted from the emitter of said first transistor to said capacitor, whereby the voltage at said connecting terminal is changed.

5. The combination of claim 4, wherein said second outer terminal of said current source is negative with respect to the first outer terminal of said current source and the voltage pulse has a magnitude and polarity such that said connecting terminal is driven a given amount more negative than said second outer terminal.

6. Apparatus for detecting the flow of current in a current-transmitting means comprising first and second input terminals connected to said current-transmitting means, resistor means connected between said first and second input terminals so that the current flowing through said current-transmitting means generates a voltage related to said current flow, said resistor means including first and second output terminals, a source of current including first and second outer terminals, a constant current source connected between the outer terminals of said current source and including an output terminal, first and second transistors each including a collector, an emitter, and a base, first and second resistors connecting the output terminal of said constant current source respectively to the emitters of said first and second transistors, means for connecting the first and second output terminals of said resistor means to the bases of said first and second transistors respectively, third and fourth resistors including first and second ends respectively, means for connecting the first end of said third resistor to the collector of said first transistor, means for connecting the first end of said fourth resistor to the collector of said second transistor, connecting-point means for connecting the second ends of said third and fourth resistors together, signal output means including first and second inputs connected to the collectors of said first and second transistors and an output terminal for transmitting voltage pulses in accordance with the flow of current through said resistor means; and voltage-difference-maintaining means connected between said connecting-point means and the second outer terminal of said current source for maintaining the voltage difference between the first input terminal of said resistor means and said connecting-point means greater than a given minimum value.

7. The apparatus of claim 6, wherein said voltage-difference-maintaining means includes a unilaterally conducting device for connecting said connecting-point means to said second outer terminal, and a capacitor including a first terminal connected to said connecting point means and a second terminal for receiving a voltage pulse.

8. The apparatus of claim 6, wherein said voltage-difference-maintaining means includes a unilaterally conducting device for connecting said connecting-point means to said second outer terminal, a capacitor including a first terminal connected to said connecting-point means and a second terminal, said current source further including an intermediate terminal, a third transistor including a collector, an emitter and a base, means for connecting the collector of said third transistor to the intermediate terminal of said current source, a fifth resistor connecting the emitter of said third transistor to the second outer terminal of said current source and voltage-pulse-receiving means connected to the base of said third transistor being adapted to receive a voltage pulse, and means for connecting the emitter of said third transistor to the second terminal of said capacitor so that when said voltage pulse is received by said base the voltage of said connecting-point means is driven beyond the voltage of the second outer terminal of said current source.

9. The apparatus of claim 8, wherein said voltage-pulse-receiving means includes a fourth transistor including an emitter, a collector and a base, sixth and seventh serially connected resistors connecting the intermediate terminal of said current source to the collector of said fourth transistor, means for connecting the emitter of said fourth transistor to the second outer terminal of said current source, the base of said fourth transistor being adapted to receive said voltage pulse, and means for connecting the junction of said sixth and seventh resistors to the base of said third transistor.

10. The apparatus of claim 6, wherein said constant current source comprises a third transistor having an emitter, a collector and a base, fifth and sixth serially connected resistors connected between the first and second outer terminals of said current source, a seventh resistor connected between the emitter of said third transistor and the first outer terminal of said current source, and means for connecting the junction of said fifth and sixth resistors to the base of said third transistor, the emitter of said third transistor being the output terminal.

11. The apparatus of claim 6, wherein said resistor means comprises bridge rectifier means including first, second, third and fourth serially connected arms to form a closed loop, a fifth resistor connecting the junction of said first and second arms to the junction of said third and fourth arms, means for connecting the junction of said first and second arms to the base of said first transistor, and a means for connecting the junction of said third and fourth arms to the base of said second transistor, the junction of said first and fourth arms being the first input terminal and the junction of said second and third arms being the second input terminal.

12. The apparatus of claim 6, wherein said signal output means comprises a third transistor including an emitter, a collector and a base, a fifth resistor for connecting the collector of said third transistor to the first outer terminal of said current source, means connecting the base of said third transistor to the collector of said second transistor, means for connecting the emitter of said third transistor to the collector of said first transistor, and output means connected to the emitter of said third transistor.

13. The apparatus of claim 12, wherein said output means comprises a fourth transistor including an emitter, a collector and a base, a sixth resistor connecting the emitter of said fourth transistor to the first outer terminal of said current source, a seventh resistor connecting the base of said fourth transistor to the second outer terminal of said current source, means for connecting the collector of said fourth transistor to the second outer terminal of said current source, and an output terminal connected to the emitter of said fourth transistor.

References Cited

UNITED STATES PATENTS 3,149,568  9/1964   Gerber _____ 244—3.12 X
3,264,550  8/1966   Paice _____ 323—9
3,305,764  2/1967   Todd _____ 323—9

JOHN F. COUCH, *Primary Examiner.*

W. E. RAY, *Assistant Examiner.*